United States Patent Office 3,649,651
Patented Mar. 14, 1972

---

3,649,651
DIBENZOFURAN DERIVATIVES AND PREPARATION THEREOF
Thomas A. Dobson, Montreal, Quebec, Canada, assignor to American Home Products Corporation, New York, N.Y.
No Drawing. Filed July 2, 1969, Ser. No. 838,673
Int. Cl. C07d 5/44
U.S. Cl. 260—346.2
5 Claims

ABSTRACT OF THE DISCLOSURE

There are disclosed herein -1 - (2 - dibenzofuryl)-1,4-butanediol, 2-dibenzofuryl 3-hydroxypropyl ketone, γ-oxo - 2 - dibenzofuranbutyraldehyde and γ-hydroxy-2-dibenzofuranbutyraldehyde, as well as processes for their preparation. These compounds possess antiinflammatory properties and methods for their use are disclosed.

BACKGROUND OF THE INVENTION

This invention relates to new dibenzofuran derivatives, to processes for their preparations and to intermediates used in these processes.

More specifically, this invention relates to derivatives of dibenzofuran in which the dibenzofuran nucleus is substituted by the radical —X—$CH_2CH_2$—Y in which X represents a carbonyl or a hydroxymethylene group and Y represents a formyl or a hydoxymethyl group.

The dibenzofuan derivatives of this invention possess interesting pharmacologic properties. For example, these derivatives exhibit antiinflammatory activity at concentration levels that afford protective effects without deleterious side effects. Such antiinflammatory agents are useful for the treatment of rheumatoid arthritis.

The discovery of antiinflammatory activity for the dibenzofuran derivatives of this invention is noteworthy, especially when considered in the light of prior art. The dibenzofuran moiety, which is the most prominent feature of the compounds of this invention, is not a feature of the groups of compounds known to possess antiinflammatory activity, see, for example, C. A. Winter in "Drug Research," Birkhauser Verlag, volume 10, 1966, page 139.

SUMMARY OF THE INVENTION

Still more specifically, this invention relates to dibenzofuran derivatives of general Formula I

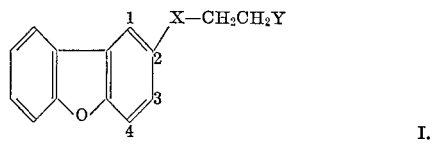

in which X and Y are as defined above.

The compounds of this invention may be more formally described by the following chemical names:
1-(2-dibenzofuryl)-1,4-butanediol (I, X=CHOH and Y=$CH_2OH$),
2,dibenzofuryl 3-hydroxypropyl ketone (I, X=C=O and Y=$CH_2OH$),
γ-Oxo-2-dibenzofuranbutyraldehyde

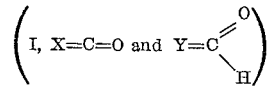

and
γ-Hydroxy-2-dibenzofuranbutyraldehyde

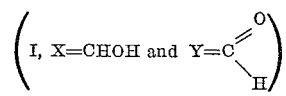

DETAILED DESCRIPTION OF THE INVENTION

The dibenzofuran derivatives of this invention of general Formula I exhibit utility as antiinflammatory agents. This antiinflammatory property may be readily demonstrated in standard pharmacologic tests, for example, the tests similar to those described by Robert A. Turner in "Screening Methods in Pharmacology," Academic Press, page 152, 1965, based on the reduction of pedal inflammation.

When the dibenzofuran derivatives of this invention are employed as antiinflammatory agents in warm-blooded animals, e.g., rats, they may be administered orally, alone or in tablets combined with pharmacologically acceptable excipients, such as starch, milk sugar and so forth. They may also be administered orally in the form of solutions in suitable vehicles such as vegetable oils.

The dosage of the dibenzofuran derivatives of this invention will vary with the particular compound chosen and form of administration. Furthermore, it will vary with the particular host under treatment. Generally, the compounds of this invention are administered at a concentration level that affords protective effects without any deleterious side effects. These effective concentration levels are usually obtained with a therapeutic range of 1 mg. to 100 mg. per kilo per day, with a preferred range of 5 mg. to 25 mg. per day.

To prepare the compound of this invention I prefer to use processes which may be illustrated as follows:

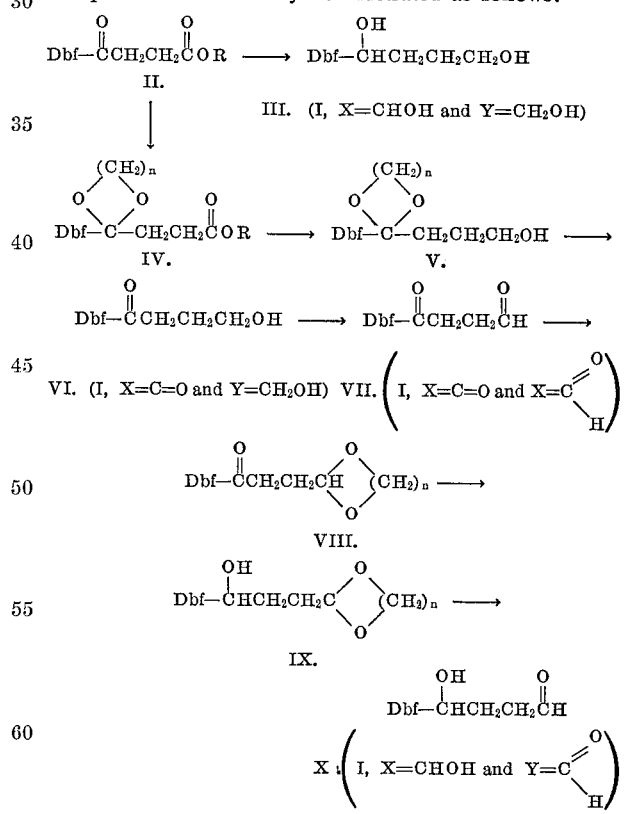

in which Dbf represents a 2-dibenzofuranyl radical, R represents a lower alkyl group containing one to six carbon atoms, and n represents an integer from two to four.

The preferred starting materials for the compounds of this invention is the known γ-oxo-2-dibenzofuranbutyric acid, described by F. Mayer and W. Krieger, Ber. 55B, 1659 (1922) and H. Gilman et al., J. Amer. Chem. Soc., 61, 2842 (1939), or its corresponding lower alkyl esters, containing one to six carbon atoms, preferably one to two carbon atoms. The corresponding ethyl ester is described by F. Mayer and W. Krieger, cited above, the remaining esters may be prepared by conventional methods, such as those described by L. F. Fieser and M. Fieser, in "Advanced Organic Chemistry," Reinhold Publishing Corp., 1961, pages 370–380.

In practising this invention, 1-(2-dibenzofuryl)-1,4-butanediol (III), the compound of this invention of Formula I in which X represents a hydroxymethylene group and Y represents a hydroxymethyl group, may be prepared directly by treating γ-oxo-2-dibenzofuranbutyric acid or its corresponding lower alkyl esters of Formula II with an alkali metal aluminum hydride complex, preferably lithium aluminum hydride.

A preferred procedure for accomplishing the preceding process is illustrated above by the designation (II→III). More explicitly, methyl γ-oxo-2-dibenzofuranbutyrate (II, R=CH₃) is treated with a molar excess of lithium aluminum hydride in an inert solvent, such as, for example, ether, tetrahydrofuran or dioxane, at a temperature ranging from 20 to 100° C. for a period of 0.5 to 3 hours. Room temperature and a period of two hours are very practical choices for the temperature and reaction time. Afterwards the reaction mixture is decomposed carefully by the addition of water and the product (III) may be isolated by standard laboratory techniques comprising filtration to remove the inorganic salts and evaporation of the filtrate.

2-dibenzofuryl 3-hydroxypropyl ketone (VI), the compound of this invention of Formula I in which X represents a carbonyl group and Y represents a hydroxymethyl group may be prepared by a three step process starting from a corresponding lower alkyl ester of Formula II by protecting the ketonic group of the said ester as a ketal, reducing the ketal intermediate with an alkali metal aluminum hydride complex, and subsequently removing the protecting ketal group.

More specifically, the above three step process may be conveniently practised by first treating the lower alkyl ester of Formula II, preferably the methyl ester, with an excess of a α,ω-alkanediol containing two to four carbon atoms, preferably two carbon atoms, in the presence of an acid catalyst such as, for example, p-toluenesulfonic acid, in an inert solvent, such as, for example, toluene, xylene or benzene. This reaction may be performed at temperatures ranging from 80° C. to the boiling point of the inert solvent for a period of one to four days. Preferred reaction conidtions for this first step include the use of benzene as the inert solvent, and performing the reaction at the boiling point of this solvent for a period of two days; afterwards the reaction mixture is cooled, washed with 10% sodium carbonate, dried, evaporated and triturated with ether to remove any starting material. In the second step of this process, the ketal intermediate of Formula IV, thus obtained in the first step, is reduced with an alkali metal hydride complex in substantially the same manner as described above to yield the ketal intermediate of Formula V. The latter compound is then hydrolyzed with an acid, preferably sulfuric acid or hydrochloric acid, in an inert solvent, preferably a water-immiscible solvent such as, for example, methanol or acetone. Convenient reaction conditions for effecting this hydrolysis include boiling a solution of the ketal intermediate of Formula V with a 10% aqueous solution of sulfuric acid in methanol for a period of 18 hours. In this manner, there is obtained 2-dibenzofuryl 3-hydroxypropyl ketone (VI).

γ-Oxo-2-dibenzofuranbutyraldehyde (VII), the compound of this invention of Formula I in which X represents a carbonyl group and Y represents a formyl group, may be obtained directly from 2-dibenzofuryl 3-hydroxypropyl ketone (VI) by partial oxidation with a mild oxidizing agent, such as, for example, dicyclohexylcarbodiimide in dimethyl sulfoxide or chromium trioxide in pyridine.

More specifically, γ-oxo-2-dibenzofuranbutyraldehyde (VII) is prepared by treating a solution of 2-dibenozofuryl 3-hydroxypropyl ketone (VI) in an inert solvent, such as, for example, benzene, with a molar excess of a solution of dicyclohexylcarbodiimide in dimethyl sulfoxide containing a catalytic amount of a strong organic acid such as, for example, trifluoroacetic acid, and a weak organic base such as, for example, pyridine, at a temperature between 10 and 40° C. for a period of time ranging from 12 to 48 hours. The excess oxidizing agent is destroyed with an organic acid, for example, oxalic acid, and the product is isolated and purified in a conventional manner such as, for example, chromatography or crystallization. Alternatively, γ-oxo-2-dibenzofuranbutyraldehyde (VII) is prepared by treating a solution of dibenzofuryl 3-hydroxypropyl ketone (VI) in pyridine or an inert solvent such as, for example, benzene with a molar excess of a solution of chromium trioxide in either pyridine or pyridine-water at a temperature between 0 to 15° C. for a period of from 12 to 60 hours. The excess oxidant is then destroyed with a lower alkanol containing from one to four carbon atoms, preferably isopropanol, and the product (VII) is then purified as described above. Again, alternatively, a solution of the ketal intermediate V ($n=2$), 2-(2-dibenzofuryl)-1,3-dioxolane-2-propanol, may be oxidized as described above with either dicyclohexylcarbodiimide or chromium-dioxide in pyridine to give 2-(2-dibenzofuryl)-1,3-dioxolane 2-propionaldehyde. The latter compound is then dissolved in a mixture of a lower alkanol containing from one to four carbon atoms such as, for example, ethanol, and a dilute mineral acid such as, for example, 10% sulphuric acid, and heated under reflux for a period of one-half to four hours to give γ-oxo-2-dibenzofuranbutyraldehyde (VIII).

Finally, γ-hydroxy-2-dibenzofuranbutyraldehyde (X), the compounds of this invention of Formula I in which X represents a hydroxymethylene group and Y represents a formyl group, may be prepared from γ-oxo-2-dibenzofuranbutyraldehyde (VII) by protecting the aldehyde function as an acetal, reducing the acetal intermediate with an alkali metal aluminum hydride complex and finally removing the protecting acetal group.

More specifically, a solution of γ-oxo-2-dibenzofuranbutyraldehyde (VII) in an inert solvent such as, for example, benzene, toluene, or xylene, is treated with one molar equivalent of a α,ω-alkanediol containing from two to four carbon atoms, preferably two carbon atoms, and a catalytic quantity of a strong acid such as, for example, sulphuric acid or p-toluenesulphonic acid, at a temperature between 50° and 140° for a period of from one-half to six hours to give, after processing in a conventional manner, the intermediate acetal of Formula VIII, for example, 2-dibenzofuryl 2-(1,3-dioxolan-3-yl)ethyl ketone. Alternatively, the latter compound may also be prepared by treating a solution of 2-(2-dibenzofuryl)-1,3 - dioxolane-2-propionaldehyde, prepared as described above, in a lower alkanol containing from one to four carbon atoms such as, for example, ethanol, with a catalytic quantity of a strong acid such as, for example, sulphuric acid or p-toluenesulphonic acid, at a temperature in the range of 10–60° C. for a period of from 0.5 to 24 hours.

The intermediate acetal of Formula VIII, for example, 2-dibenzofuryl 2-(1,3-dixolan-2-yl)ethyl ketone, is dissolved in a lower alkanol containing from one to four carbon atoms and treated with a molar excess of analkali metal borohydride complex such as, for example, sodium borohydride, at a temperature ranging from 20 to 60° C. for a period of two to twelve hours. The solvent is removed and the residue is washed with water to leave the ketal intermediate of Formula IX, for example α-[2-(1,3-dioxolan-2-yl)ethyl]-2-dibenzofuranmethanol. In its turn a solution of the ketal intermediate of Formula IX in a mixture of a lower alkanol containing from one to four carbon atoms such as, for example, ethanol, and a dilute mineral acid such as, for example, 10% sulphuric acid or 10% hydrochloric acid is kept at a temperature between 20 and 100° C. for a period of from one to 24 hours to give, after processing in a conventional manner, γ-hydroxy-2-dibenzofuranbutylraldehyde (X).

The following examples will illustrate this invention.

Example 1.—1-(2-dibenzofuryl)-1,4-butanediol (III)

A solution of methyl γ-oxo-2-dibenzofuranbutyrate (20 g.), M.P. 113–115° C., in anhydrous benzene (80 ml.) and anhydrous ether (60 ml.) is added dropwise to a stirred suspension lithium aluminum hydride (5.0 g.) in anhydrous ether (100 ml.). When the addition is complete the mixture is heated under reflux for two hours. The mixture is then cooled and a mixture of water (20 ml.) and tetrahydrofuran (60 ml.) is added dropwise. The resulting suspension is filtered through a celite pad; the pad is extracted with boiling methanol and these extracts and the original filtrate are combined and evaporated. The residue is crystallized from ethanol to give the title product, M.P. 131–133°.

In the same manner, but using an equivalent amount of γ-oxo-2-dibenzofuranbutyric acid or ethyl γ-oxo-2-dibenzofuranbutyrate instead of methyl γ-oxo-2-dibenzofuranbutyrate, the title compound is also obtained.

Example 2.—Methyl 2-(2-dibenzofuryl)-1,3-dioxolane-2-propionate (IV, R=CH₃ and n=2)

A mixture of methyl γ-oxo-2-dibenzofuranbutyrate (100 g.), M.P. 133–115° C. benzene (500 ml.), ethylene glycol (100 ml.) and p-toluenesulphonic acid (0.5 g.) is stirred and heated under partial reflux for 2 days. The mixture is cooled and washed with 10% sodium carbonate solution and then with water. The benzene solution is dried and evaporated. The residue is stirred under anhydrous ether (400 ml.) for 30 minutes. The insoluble starting material is separated and the filtrate is evaporated to leave the title compound as a viscous oil, which is characterized by its infrared spectrum,

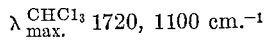
$\lambda_{max.}^{CHCl_3}$ 1720, 1100 cm.⁻¹

The title compound is not purified further but is used as such for the next step, see Example 3.

In the same manner, but using an equivalent amount of 1,3-propanediol or 1,4-butanediol instead of ethylene glycol, the ketal intermediates, methyl 2-(2-dibenzofuryl)-1,3-dioxane-2-propionate and methyl 2-(2-dibenzofuryl)-1,3-dioxepane-2-propionate, are obtained, respectively.

In the same manner, but using an equivalent amount of ethyl γ-oxo-2-dibenzofuranbutyrate instead of methyl γ-oxo-2-dibenzofuranbutyrate and using ethylene glycol, 1,3-propanediol or 1,4-butane diol as the α,ω-alkanediol, the ketal intermediates, ethyl 2-(-dibenzofuranyl)-1,3-dioxolane-2-propionate, ethyl 2-(2-dibenzofuranyl)-1,3-dioxane-2-propionate and ethyl 2-(2-dibenzofuranyl)-1,3-dioxepane-2-propionate, are obtained respectively.

Example 3.—2-(2-dibenzofuryl)-1,3-dioxolane-2-propanol (V, n=2)

A solution of methyl 2-(2-dibenzofuryl)-1,3-dioxolane-2-propionate (100 g.), prepared as described in Example 2, in a mixture of ether (300 ml.) and benzene (200 ml.) is added dropwise to a stirred suspension of lithium aluminum hydride (20 g.) in ether (200 ml.). The mixture is heated under reflux for 2 hr. cooled, and then cautiously treated with water. The mixture is filtered and the filtrate is washed with water, dried, and evaporated to leave the title compound as a viscous oil, characterized by its nuclear magnetic resonance (NMR) spectrum which shows absorption at 101 Hz., 126 Hz., 217 Hz., 237 Hz., 430–440 Hz. and 127 Hz. (exchangeable).

The title compound is not purified further but used as such for the next step, see Example 4.

In the same manner, but using an equivalent amount of the ethyl 2-(2-dibenzofuryl)-1,3-dioxolane-2-propionate, the methyl or ethyl 2-(2-dibenzofuryl)-1,3-dioxane-2-propionate, or the methyl or ethyl 2-(2-dibenzofuryl)-1,3-dioxepane-2-propionate, prepared as described in Example 2, instead of methyl 2-(2-dibenzofuryl)-1,3-dioxolane-2-propionate, the title compound, 2-(2-dibenzofuryl)-1,3-dioxane - 2 - propanol and 2-(2-dibenzofuryl)-1,3-dioxepane-2-propanol, is obtained respectively.

Example 4.—2-dibenzofuryl 3-hydroxypropyl ketone (VI)

A solution of 2-(2-dibenzofuryl)-1,3-dioxolane-2-propanol (86 g.), prepared as described in Example 3, in methanol (1300 ml.) and 10% sulphuric acid (255 ml.) is refluxed for 18 hours. The mixture is concentrated under reduced pressure and then extracted with ether. The extracts are dried and evaporated and the residue is crystallized from either benzene or isopropanol to give the title product, M.P. 76–79° C.

In the same manner, but using an equivalent amount of 2-(2-dibenzofuryl) - 1,3 - dioxane - 2 - propanol or 2-(2-dibenzofuryl) - 1,3 - dioxepane-2-propanol instead of 2-(2-dibenzofuryl) - 1,3 - dioxolane - 2 - propanol, the title compound is also obtained.

Example 5.—γ-Oxo-2-dibenzofuranbutyraldehyde (VII)

A solution of dicyclohexylcarbodiimide (10 g.) in benzene (20 ml.) is added to a stirred solution of the title compound of Example 4, (4.0 g.), prepared as described in Example 4, in dimethyl sulphoxide (20 ml.), pyridine (0.4 ml.), and trifluoroacetic acid (0.2 ml.). The mixture is kept at room temperature for 24 hours, and then treated with a solution of oxalic acid (8.0 g.) in ethanol (40 ml.). The mixture is diluted with ether (500 ml.) and then filtered. The filtrate is washed with saturated sodium bicarbonate solution and then with water, and then dried and evaporated. The residue is chromatographed on a silica gel column eluting with chloroform to give the title product which is crystallized from isopropanol to M.P. 76–78°.

Alternatively, a solution of the title compound of Example 4 (5 g.), prepared as described in Example 4, in pyridine (50 ml.) at 0° is added to a solution of chromium trioxide (5.0 g.) in water (10 ml.) and pyridine (90 ml.). The mixture is kept at 5° C. for 2 days and then diluted with 2 N sulphuric acid (500 ml.) and extracted with ether. The extracts are repeatedly washed with 2 N sulphuric acid, then with water, and then dried and evaporated. The mixture is purified as above to give the title compound, M.P. 76–78°.

Alternatively, a mixture of 2-(2-dibenzofuryl)-1,3-dioxolane-2-propionaldehyde (5 g.), prepared as described in Example 6, ethanol (70 ml.) and 10% sulphuric acid (30 ml.) is heated under reflux for 4 hours. The mixture is concentrated under reduced pressure and then extracted with ether. The extracts are evaporated and the residue is purified as described above to give the title product, M.P. 76–78°.

Example 6.—2-(2-dibenzofuryl)-1,3-dioxolane-2-propionaldehyde

A solution of 2-(2-dibenzofuryl)-1,3-dioxolane-2-propanol (12 g.), prepared as described in Example 3, is treated with dicyclohexylcarbodiimide following the procedure described in Example 5. The crude product is purified by chromatography upon an alumina column eluting with benzene to give the title product as a viscous oil characterized by its infra-red spectrum which shows

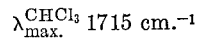
$\lambda_{max.}^{CHCl_3}$ 1715 cm.⁻¹ and by its NMR spectrum which shows absorption at 147 Hz., 235 Hz., 430–490 Hz., and 584 Hz.

Example 7.—2-dibenzofuryl 2-(1,3-dioxolan-2-yl)ethyl ketone (VIII, n=2)

A solution of γ-oxo-2-dibenzofuranbutyraldehyde (5.0 g.), prepared as described in Example 5, ethylene glycol (1.24 g.), benzene (20 ml.) and p-toluenesulfonic acid (100 mg.) is heated under partial reflux for 6 hours. The mixture is washed with water, dried, evaporated and the residue is crystallized from benzene-hexane to give the title product, M.P. 113–115°.

In the same manner, but using an equivalent amount of 1,3-propanediol, or 1,4-butanediol instead of ethylene glycol, 2-dibenzofuryl-2-(1,3-dioxan-2-yl)ethyl ketone and 2-dibenzofuryl-2-(1,3-dioxepan-2-yl)ethyl ketone are obtained, respectively.

Alternatively, a solution of 2-(2-dibenzofuryl)-1,3-dioxolane-2-propionaldehyde (3.0 g.), prepared as described in Example 6 and p-toluenesulfonic acid (100 mg.) in ethanol (30 ml.) is kept at room temperature for 24 hours. The mixture is evaporated to dryness and the residue is crystallized from benzene-hexane to give the title product, M.P. 113–115°.

Example 8.—α-[2-(1,3-dioxolan-2-yl)ethyl]-2-dibenzofuranmethanol (IX, n=2)

A solution of 2-dibenzofuryl 2-(1,3-dioxolan-2-yl)ethyl ketone (5.0 g.), prepared as described in Example 7, in ethanol (50 ml.) is treated with sodium borohydride (.50 g.). The mixture is kept at room temperature for 8 hours and then concentrated. The residue is partitioned between ether and water. The organic phase is washed with water, dried, and evaporated to leave the title product.

In the same manner, but using an equivalent amount of 2-dibenzofuryl 2-(1,3-dioxan-2-yl)ethyl ketone or 2-dibenzofuryl 2-(1,3-dioxepan-2-yl)ethyl ketone, prepared as described in Example 7, instead of 2-dibenzofuryl 2-(1,3-dioxolan-2-yl)ethyl ketone, α-[2-(1,3-dioxan-2-yl)ethyl]-2-dibenzofuranmethanol and α-[2-(1,3-dioxepan-2-yl)ethyl]-2-dibenzofuranmethanol are obtained, respectively.

Example 9.—γ-Hydroxy-2-dibenzofuranbutyraldehyde (X)

A solution of the title compound of Example 8 (4.0 g.), prepared as described in Example 8 in ethanol (50 ml.) and 10% sulphuric acid (10 ml.) is heated under reflux for 12 hours. The mixture is concentrated under reduced pressure and the residue is partitioned between chloroform and water. The organic phase is washed, dried and evaporated to leave the title compound

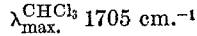

$\lambda_{max.}^{CHCl_3}$ 1705 cm.$^{-1}$

In the same manner, but using an equivalent amount of α-[2-(1,3-dioxan-2-yl)ethyl]-2-dibenzofuranmethanol or α-[2-(1,3-dioxepan-2-yl)ethyl]-2-dibenzofuranmethanol instead of the title compound of Example 8, the title compound of this example is obtained.

I claim:
1. A compound selected from those of the formula

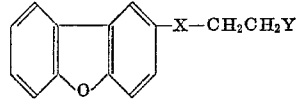

wherein X is selected from the group consisting of carbonyl and hydroxymethylene; and Y is selected from the group consisting of formyl and hydroxymethyl.

2. 1-(2-dibenzofuryl)-1,4-butanediol, as claimed in claim 1.

3. 2-dibenzofuryl 3-hydroxypropyl ketone, as claimed in claim 1.

4. γ-oxo-2-dibenzofuranbutyraldehyde, as claimed in claim 1.

5. γ-hydroxy-2-dibenzofuranbutyraldehyde, as claimed in claim 1.

References Cited

Gilman et al.: Chem. Abstracts (1940), vol. 34, p. 2366.

ALEX MAZEL, Primary Examiner

B. I. DENTZ, Assistant Examiner

U.S. Cl. X.R.

424—285